United States Patent
Vince et al.

(10) Patent No.: US 6,934,303 B2
(45) Date of Patent: *Aug. 23, 2005

(54) METHODS AND APPARATUS FOR CONSTRUCTING A PROGRAM ASSOCIATION TABLE WHEN REDUCING MULTIPLEXED DATA STREAMS

(75) Inventors: Lawrence D. Vince, Lansdale, PA (US); Jeffrey Paul Viola, Glen Mills, PA (US); James R. Harris, Haddonfield, NJ (US); Arthur P. Jost, Mt. Laurel, NJ (US); Richard DiColli, Broomall, PA (US); Erik Elstermann, Carlsbad, CA (US); Jeffrey D. Kuczynski-Brown, Elkins Park, PA (US)

(73) Assignee: General Instrument Corporation, Horsham, PA (US)

( * ) Notice: Subject to any disclaimer, the term of this patent is extended or adjusted under 35 U.S.C. 154(b) by 929 days.

This patent is subject to a terminal disclaimer.

(21) Appl. No.: 09/800,806

(22) Filed: Mar. 7, 2001

(65) Prior Publication Data

US 2002/0126702 A1 Sep. 12, 2002

(51) Int. Cl.[7] .................................................. H04J 1/00
(52) U.S. Cl. ........................ 370/485; 370/486; 370/537; 370/538; 370/536
(58) Field of Search ................................ 370/485, 486, 370/537, 538, 466, 465, 474, 477, 536, 389, 391; 725/101, 34, 89, 134, 139, 38, 68, 70; 348/731, 423.1, 472

(56) References Cited

U.S. PATENT DOCUMENTS

| | | | |
|---|---|---|---|
| 5,835,493 A | | 11/1998 | Magee et al. |
| 6,148,082 A | | 11/2000 | Slattery et al. |
| 6,359,883 B1 | * | 3/2002 | Lechleider ................... 370/389 |
| 6,466,592 B1 | * | 10/2002 | Chapman ..................... 370/537 |
| 6,477,185 B1 | * | 11/2002 | Komi et al. ................. 370/536 |
| 6,598,233 B1 | * | 7/2003 | Choi .......................... 725/151 |
| 6,765,961 B2 | * | 7/2004 | Segawa et al. ......... 375/240.01 |
| 6,771,657 B1 | * | 8/2004 | Elstermann ................. 370/465 |

FOREIGN PATENT DOCUMENTS

WO  98/16067  4/1998

OTHER PUBLICATIONS

Cartwright, C.T., "Issues in Multiplex and Service Management in Digital Multichannel Broadcasting", International Broadcasting Convention, Sep. 1997, pp. 308–313.

Wasilewski, Anthony J., "The MPEG–2 Systems Specification: A Common Transport for the Digital Highway", Annual Review of Communications, National Engineering Consortium, 1997, pp. 785–795.

"ETR 211: Digital Video Broadcasting (DVB); Guidelines on implementation and usage of Service Information (SI)", ETSI Technical Report, Aug. 1997, pp. 1–42.

* cited by examiner

*Primary Examiner*—Wellington Chin
*Assistant Examiner*—Chuong Ho
(74) *Attorney, Agent, or Firm*—Esteban A. Rockett (57) ABSTRACT

The present invention provides methods and apparatus for creating a Program Association Table (PAT) for a reduced portion of a multiplexed data stream, when the multiplexed data stream has been reduced, for example, to carry fewer services over a cable television plant. More particularly, the present invention provides methods and apparatus for creating a PAT for a desired combination of multiplexed data stream subgroups contained within an incoming data stream, when the incoming multiplexed data stream is reduced. The invention enables a new PAT to be output which correctly corresponds to the services in a reduced data stream (e.g., for cable-side transmissions). The present invention is particularly useful when reducing high data rate satellite television data streams for cable-side transmission.

34 Claims, 5 Drawing Sheets

METHODS AND APPARATUS FOR CONSTRUCTING A PROGRAM ASSOCIATION TABLE WHEN REDUCING MULTIPLEXED DATA STREAMS

BACKGROUND OF INVENTION

The present invention relates generally to the field of digital communications, such as the communication of television, multimedia, and/or interactive entertainment and information signals. In particular, the present invention provides methods and apparatus for creating a Program Association Table (PAT) for a multiplexed data stream that is to be reduced to carry fewer services for, e.g., cable-side transmission via a cable television plant. More particularly, the present invention provides methods and apparatus for creating a PAT that represents a desired combination of multiplexed data stream subgroups contained within an incoming high data rate data stream, such as a high data rate Quadrature Phase Shift Keying (QPSK) modulated multiplexed data stream, when the incoming multiplexed data stream is to be reduced.

When processing high data rate satellite data feeds, it is often necessary to reduce the multiplexed data streams, e.g., for a cable-side multiplex. When reducing a high data rate data stream, some services (such as certain cable television channel services) are dropped. Only a subset of the services in the incoming high data rate data stream may appear in the reduced cable-side output data stream. Therefore, the original PAT of the incoming high data rate data stream may no longer be valid for the reduced multiplex.

It would be advantageous to provide methods and apparatus which allow a cable or satellite television headend decoder/transcoder to create and output a PAT which correctly corresponds to the services in the reduced data stream. It would be further advantageous to provide a high data rate data stream which comprises a predefined set of data stream subgroups, each of the subgroups containing a one or more services. It would be even further advantageous to provide predefined combinations of the data stream subgroups, each of which predefined combination produces a data stream with a desired reduced data rate. It would be still further advantageous to provide hidden PATs which correspond to each predefined combination of data stream subgroups, and to select a PAT corresponding to the desired subgroup combination for output with the desired subgroup combination as the reduced cable-side data stream.

The methods and apparatus of the present invention provide the aforesaid and other advantages.

SUMMARY OF THE INVENTION

The present invention provides methods and apparatus for creating a Program Association Table (PAT) for a reduced portion of a multiplexed data stream when the multiplexed data stream is to be reduced for cable-side transmission in a cable television plant or the like. More particularly, the present invention provides methods and apparatus for creating a PAT for a desired combination of multiplexed data stream subgroups contained within an incoming high data rate data stream, such as a high data rate Quadrature Phase Shift Keying (QPSK) modulated multiplexed data stream, when the incoming multiplexed data stream is to be reduced.

It should be appreciated that although the invention is disclosed in connection with a cable television implementation, the invention is not limited to such an embodiment, and can be used for other digital data communication applications where a corrected PAT or similar construct is required for a data stream that has been reduced.

In an example embodiment of the invention, a program association table (PAT) is constructed when reducing a multiplexed data stream. A transcoder is provided which receives an inbound multiplexed data stream. The inbound multiplexed data stream contains: an all-inclusive PAT; a plurality of predefined multiplexed data stream subgroups, each of which may contain one or more services (e.g., HBO®, Cinemax®, pay-per-view events, or the like); and a plurality of hidden PATs. Each hidden PAT may be identified by a unique packet identifier (PID) and associated with an allowable predefined combination of the multiplexed data stream subgroups. A processor associated with the transcoder may be provided to receive the all-inclusive PAT and the hidden PATs from the transcoder. The all-inclusive PAT corresponds to all the services contained within the inbound data stream. Each hidden PAT corresponds to only the services contained in one predefined subgroup combination.

One hidden PAT may be selected (e.g., by the processor) which corresponds to a desired combination of multiplexed data stream subgroups. The PID makeup of the desired multiplexed data stream subgroup combination may then be determined (e.g., at the processor) from the selected hidden PAT. The all-inclusive PAT, unused hidden PATs, and any subgroups not contained in the desired multiplexed data stream subgroup combination may then be dropped, so that any services which are not to be included in the reduced outbound multiplex are removed, along with certain information associated therewith. The selected hidden PAT may be re-mapped (e.g., by the transcoder in association with the processor) to a predetermined PID. The re-mapped PAT may be output from the transcoder with the selected multiplexed data stream subgroup combination.

The predetermined PID may comprise the PID of the all-inclusive PAT. Thus, for example, the predetermined PID may comprise PID 0X0000.

The inbound multiplexed data stream may comprise a plurality of multiplexed data streams. The plurality of multiplexed data streams may be from a plurality of sources. The plurality of sources may, for example, comprise two or more satellite feeds.

The inbound multiplexed data stream may be a data stream adhering to a Moving Picture Experts Group (MPEG) standard or the like. The inbound multiplexed data stream may be a high data rate stream carried on a multiphase carrier having I and Q phases. A first plurality of subgroups may be carried in the I phase and a second plurality of subgroups may be carried in the Q phase. The all-inclusive PAT may consist of two separate PATs: an all-inclusive I phase PAT carried in the I phase which corresponds to all services carried in the I phase; and an all-inclusive Q phase PAT carried in the Q phase which corresponds to all services carried in the Q phase. Alternately, the inbound multiplexed data stream may be a high data rate stream carried on one of a QPSK carrier, a vestigial sideband (VSB) carrier, or the like.

In a preferred embodiment, the transcoder may output an intermediate frequency data stream having a maximum data rate of about 27 Mbps (e.g., for use in a 64 Quadrature Amplitude Modulated (QAM) cable system). Alternately, the transcoder may output an intermediate frequency data stream having a maximum data rate of about 38.8 Mbps (e.g., for use in a 256 QAM cable system). Of course, any other desired data rate required by the system over which the data is communicated may also be used.

An encoder may also be provided for constructing the inbound multiplexed data stream which is to be reduced. The encoder receives a plurality of multiplexed data stream subgroups (e.g., from various service providers). Each multiplexed data stream subgroup may contain a plurality of services (e.g., HBO®, HBO®2, HBO®3, and the like). Each service may be carried as a packet stream having its own PID.

A processor associated with the encoder creates an all-inclusive PAT corresponding to all the services contained in the plurality of data stream subgroups. The processor also defines a plurality of data stream subgroup combinations and creates for each defined combination of data stream subgroups a hidden PAT identified by a unique PID. Each hidden PAT corresponds to the services contained in said defined combination of data stream subgroups. The encoder combines the all-inclusive PAT, the hidden PATs, and the data stream subgroups to create a multiplexed data stream.

DETAILED DESCRIPTION OF THE INVENTION

Figure 1:
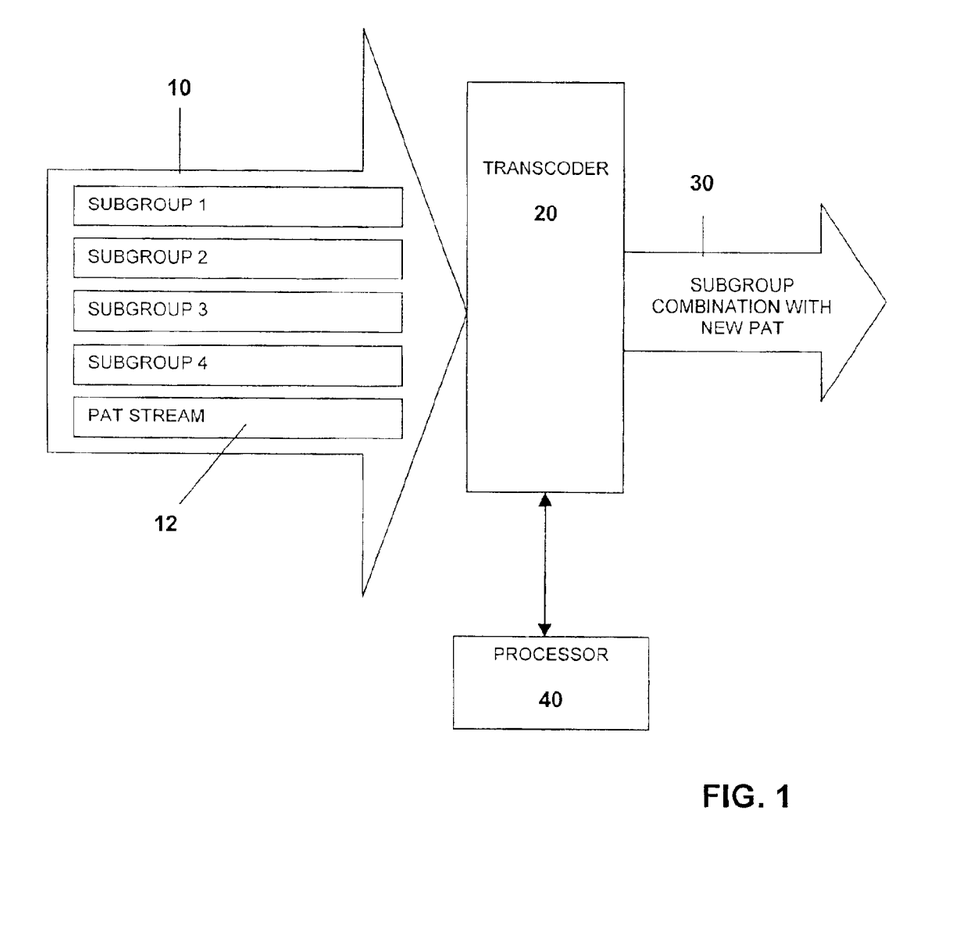
FIG. 1 is a block diagram of an illustrative embodiment of the invention.

In an illustrative embodiment of the invention as shown in FIG. 1, a new program association table (PAT) is constructed when reducing a multiplexed data stream 10. A transcoder 20 is provided which receives the inbound multiplexed data stream 10 having an all-inclusive PAT (which may be provided in a PAT stream 12 or carried in a separate stream), a plurality of predefined multiplexed data stream subgroups (subgroups 1, 2, 3 and 4), and a plurality of hidden PATs (carried in PAT stream 12). Each hidden PAT may be identified by a unique packet identifier (PID) and associated with an allowable predefined combination of the multiplexed data stream subgroups.

A detailed example of the content of the inbound multiplexed data stream 10 is provided below in connection with FIG. 2. FIG. 1 shows an inbound data stream 10 having four predefined multiplexed data stream subgroups (subgroup 1, subgroup 2, subgroup 3, and subgroup 4). However, the inbound multiplexed data stream 10 may have any number of subgroups, depending on the number of services, the data rate of each subgroup, and the data rate of the inbound multiplexed data stream 10. More specifically, there can be as many subgroups as desired, as long as the combined data rate of all of the subgroups and the PAT stream 12 does not exceed the allowed data rate for the multiplexed data stream 10. The subgroup combinations can comprise one or more of the subgroups provided. Any number of predetermined subgroup combinations can be provided for, depending on, for example, the number of subgroups provided, the data rate of each subgroup, and the desired data rate of the output from the transcoder 20.

FIG. 1 shows PAT stream 12 within the inbound multiplex 10. The PAT stream may contain the all-inclusive PAT and the hidden PATs. Alternately, as noted above, the all-inclusive PAT may be contained within the inbound data stream 10 separate and apart from the hidden PATs. The all-inclusive PAT corresponds to all of the services contained within the inbound data stream 10. Each hidden PAT corresponds to services contained in one predefined subgroup combination.

A processor 40 associated with the transcoder 20 may be provided to receive the all-inclusive PAT and the hidden PATs from the transcoder 20 as shown in FIG. 1. One hidden PAT may be selected (e.g., by the transcoder 20 in cooperation with the processor 40) which corresponds to a desired combination of multiplexed data stream subgroups. The PID makeup of the desired multiplexed data stream subgroup combination may then be determined (e.g., at the processor 40) from the selected hidden PAT. The all-inclusive PAT, unused hidden PATs, and any subgroups not contained in the desired multiplexed data stream subgroup combination may then be discarded. By discarding the all-inclusive PAT, the hidden PATs, and the unselected subgroups, the services which are not to be included in the reduced outbound multiplex 30 are removed. The selected hidden PAT may be re-mapped to a predetermined PID, e.g., by the transcoder 20 in response to commands from the processor 40, for output from the transcoder 20 with the selected multiplexed data stream subgroup combination (shown at 30).

The hidden PATs require a well-defined set of multiplexed data stream subgroups in the inbound multiplexed data stream 10. When combined in certain predetermined ways, for example, the multiplexed data stream subgroups may produce a new output data stream 30 at a desired data rate. A hidden PAT is provided for each subgroup combination. The hidden PAT corresponds to the services provided by that particular subgroup combination.

The predetermined PID may comprise the PID of the all-inclusive PAT. For example, the predetermined PID may comprise PID 0X0000, which is defined by the MPEG standard. It should be appreciated, however, that any desired PID could alternatively be used for the predetermined PID, and there is no requirement to use PID 0X0000 or any other particular PID value for this purpose.

Figure 2:
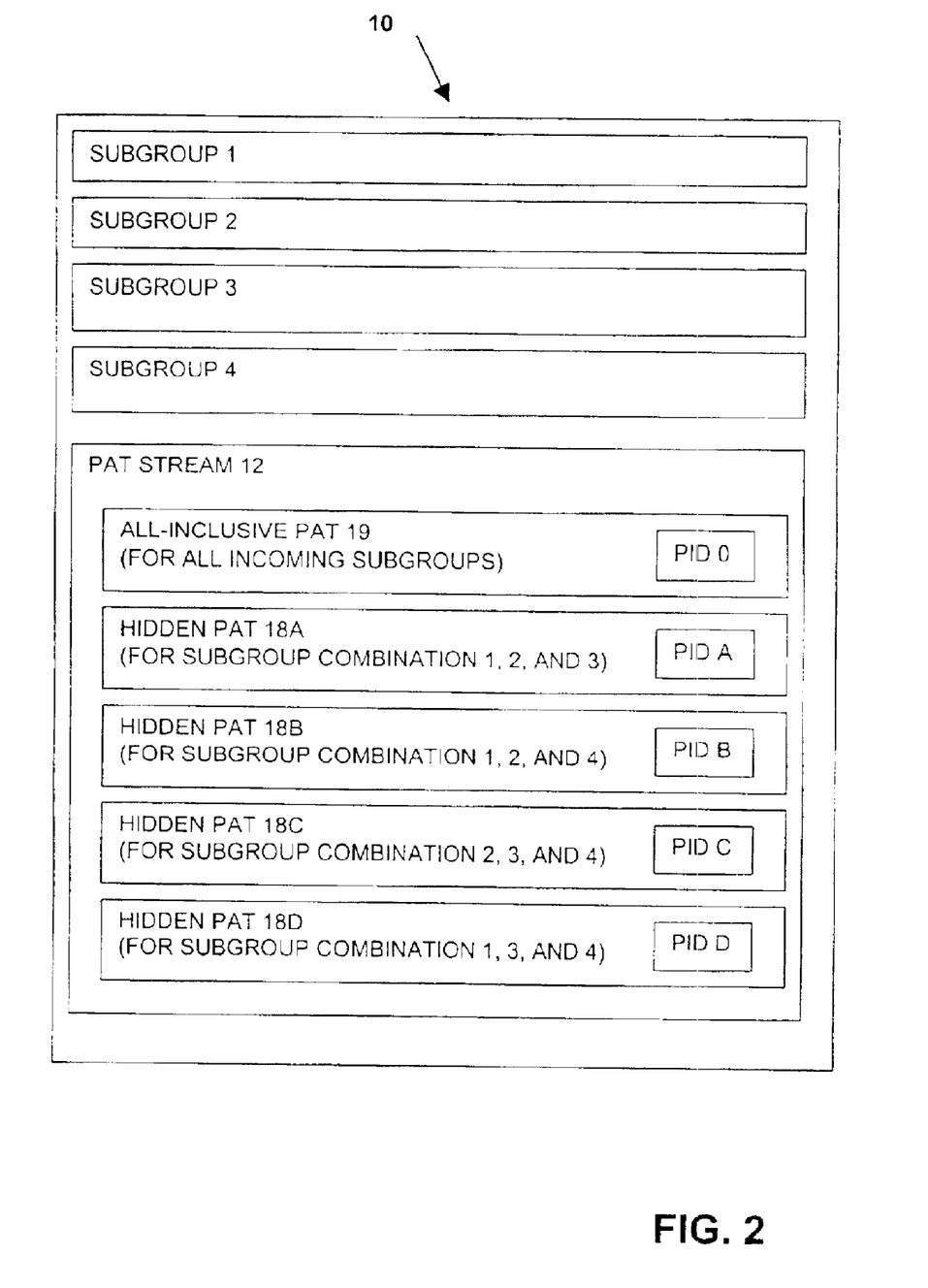
FIG. 2 is a block diagram example of an inbound data stream.

FIG. 2 shows an example of the contents of the inbound multiplex data stream 10 of FIG. 1. Inbound multiplexed date stream 10 is shown as containing four (4) subgroups, subgroup 1, subgroup 2, subgroup 3, and subgroup 4, together with PAT stream 12. PAT stream 12 is shown as carrying the all-inclusive PAT 19 (having, e.g., PID 0) and hidden PATs 18A, 18B, 18C, and 18D for the predefined subgroup combinations. The hidden PATs are identified by a unique PID (e.g., PIDs A, B, C, and D corresponding to hidden PATs 18A, 18B, 18C, and 18D respectively).

PAT stream 12 of FIG. 2 carries the all-inclusive PAT 19 as well as the hidden PATs 18A, 18B, 18C, and 18D. However, the all-inclusive PAT 19 may be carried in the inbound data stream 10 separate and apart from the hidden PATs. The number of hidden PATs carried in the inbound multiplexed data stream 10 will depend upon the number of predetermined subgroup combinations, each hidden PAT corresponding to one predetermined subgroup combination. The subgroup combinations may provide respective output data streams having different data rates.

If each predetermined subgroup combination were predefined, for example, to contain three subgroups each, there would be four possible different subgroup combinations available from the subgroups 1, 2, 3, and 4 of FIG. 2. This would result in four hidden PATs in PAT stream 12 (e.g., hidden PATs 18A, 18B, 18C, and 18D). In this example, each hidden PAT would correspond to a three subgroup combination. In certain circumstances, it may be desirable to output all services contained in the inbound multiplex 10 without reduction. In such a situation, the inbound multiplex data stream 10 may be passed, without reduction, through the transcoder 20 for output.

The inbound multiplexed data stream 10 may comprise a plurality of multiplexed data streams from a plurality of different sources. The plurality of sources may comprise, for example, two or more satellite feeds.

The inbound multiplexed data stream 10 may be an MPEG data stream. The inbound data stream 10 may be communicated using a multiphase carrier having an I phase and a Q phase. A first plurality of subgroups may be carried in the I phase and a second plurality of subgroups may be carried in the Q phase. Alternately, the inbound multiplexed data stream 10 may be a high data rate stream carried on a QPSK modulated carrier, a VSB modulated carrier, or the like. For example, the inbound multiplexed data stream 10 may be a QSPK modulated data stream comprised of two separate multiplexes, a first multiplex carried on the I phase and a second multiplex carried on the Q phase. Those skilled in the art will recognize that other modulation techniques may be used without departing from the scope of the claimed invention.

In a preferred embodiment, the transcoder 20 may output data stream 30 at a maximum data rate of about 27 Mbps and at a desired intermediate frequency (e.g., for use in a 64 QAM cable system). Alternately, the transcoder 20 may output an intermediate frequency data stream having a maximum data rate of about 38.8 Mbps (e.g., for use in a 256 QAM cable system). A receiver will then obtain the data stream 30 at the intermediate frequency for processing and ultimate use by a subscriber.

Figure 3:
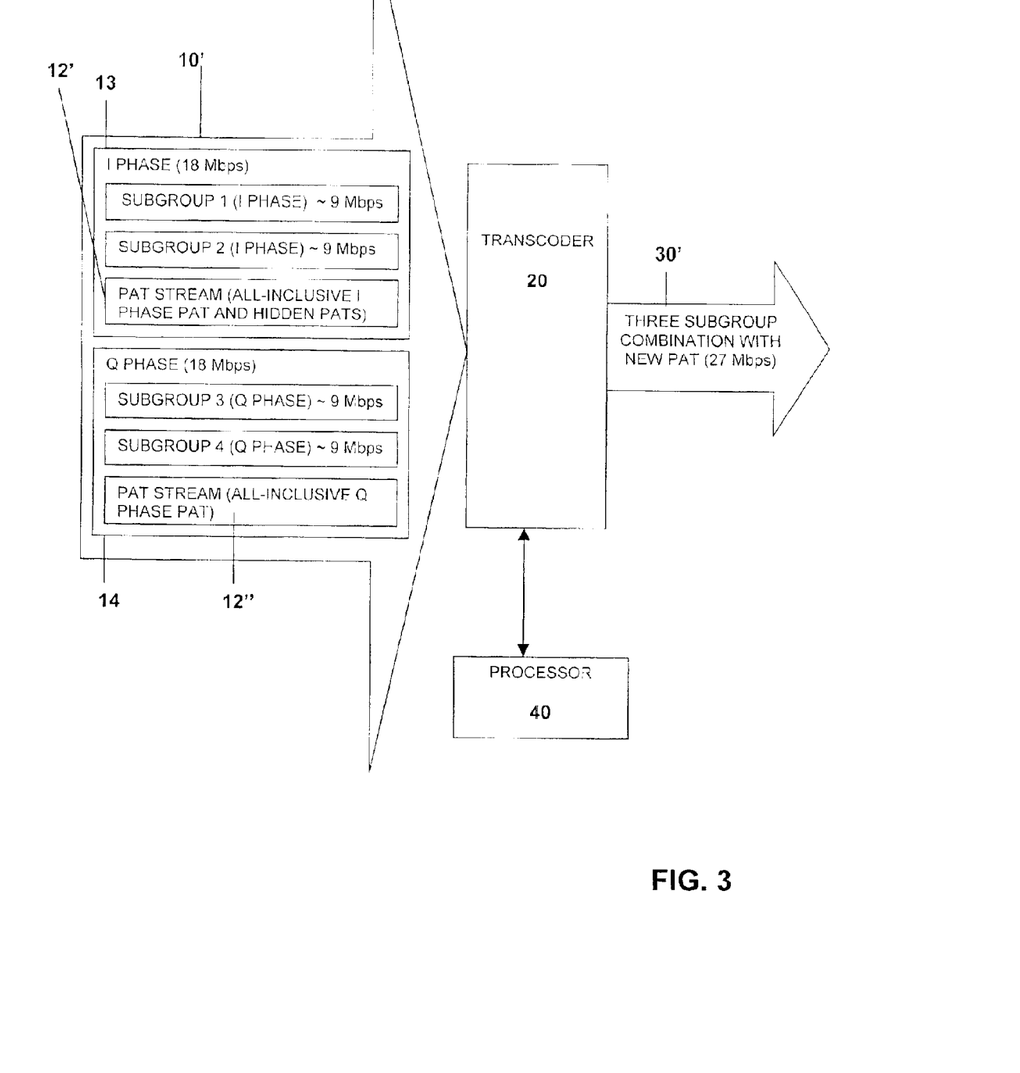
FIG. 3 is a block diagram of an example embodiment of the invention.

A specific example embodiment of the invention is shown in FIG. 3, which is applicable, e.g., to a 64 QAM cable system. The inbound multiplexed data stream 10' may be, for example, a 36 Mbps QPSK data stream composed of two 18 Mbps phases, in particular, an I phase 13 and a Q phase 14. I and Q are each composed of two subgroups of approximately 9 Mbps each. FIG. 3 shows the I phase 13 having subgroups 1 and 2 and the Q phase 14 having subgroups 3 and 4. This example implementation provides a datapipe carrying a total of four subgroups at a total data rate of approximately 36 Mbps. The I and Q phase may each have a separate all-inclusive PAT, each of which provides data on all of the services carried in that particular phase. Where a reduced multiplex having up to three of the four original subgroups is to be generated, the output of the transcoder 20 (e.g., for cable-side transmission in a 64 QAM cable system) is a maximum of ¾ of the 36 Mbps input, or approximately 27 Mbps.

Figure 4:
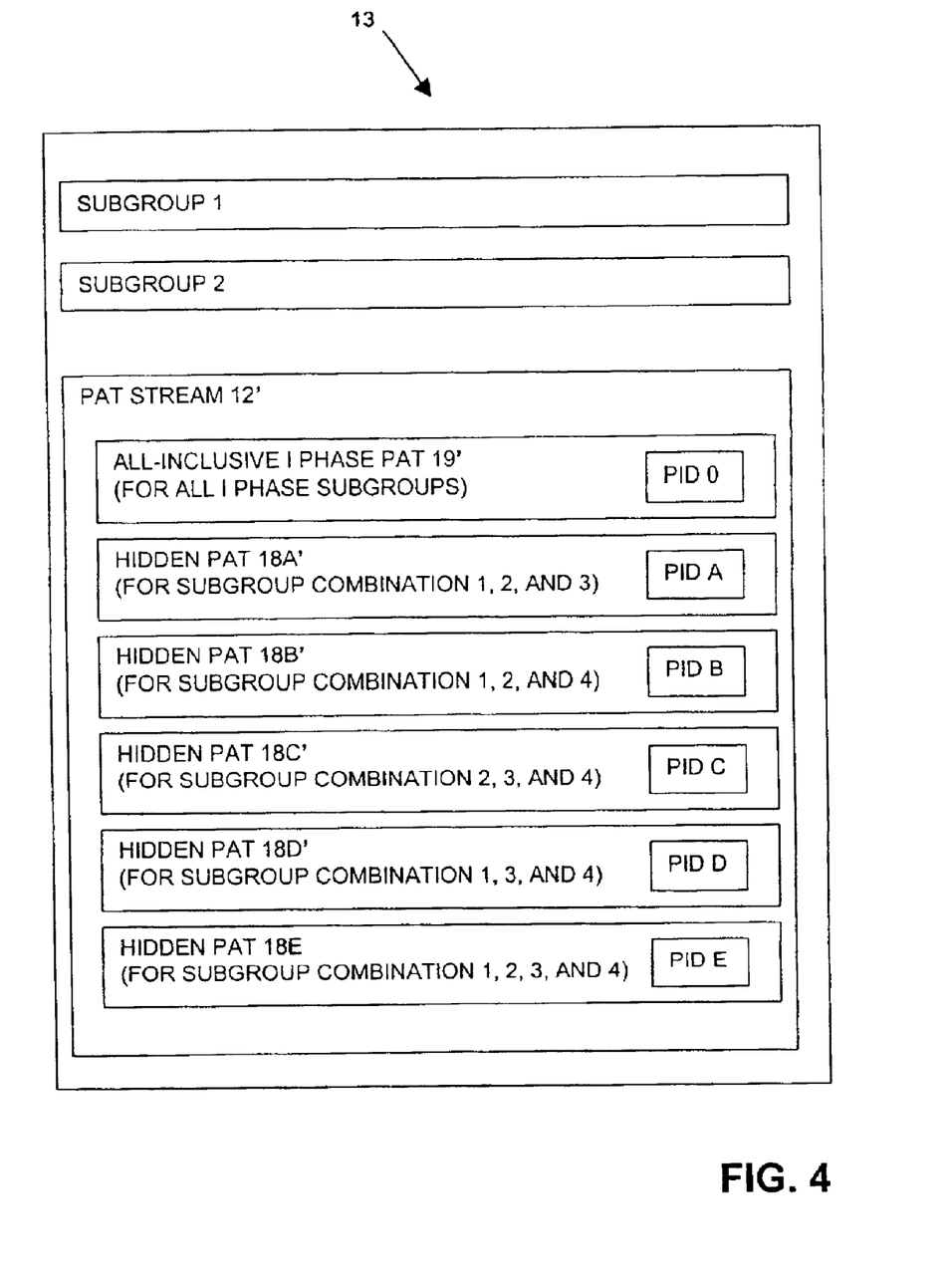
FIG. 4 is a block diagram of an example of one phase of an inbound data stream.

FIG. 4 shows an example of the contents of the I phase 13 of the incoming data stream 10' of FIG. 3. The I phase 13 is shown as carrying subgroups 1 and 2. The I phase 13 also carries a PAT stream 12' which includes an all-inclusive I phase PAT 19' corresponding to all the services carried in the I phase 13, as well as hidden PATs (e.g., hidden PATs 18A', 18B', 18C', 18D' and 18E), which correspond to the services carried in predefined combinations of subgroups 1, 2, 3, and 4. As shown in FIG. 3, the Q phase 14 carries a PAT stream 12", which includes an all-inclusive Q phase PAT corresponding to all the services carried in the Q phase 14. If desired, the hidden PATs could also be carried in the Q phase 14 in PAT stream 12". Further, as discussed above, the all-inclusive PAT information may be carried in either or both of the I and Q phases separate and apart from the hidden PATs.

In the example shown in FIGS. 3 and 4, four different combinations of three subgroups are possible, each providing for an output of about 27 Mbps. The four possible subgroup combinations are: combination 1, 2, and 3; combination 1, 3, 4; combination 1, 2, 4; and combination 2, 3, and 4. Accordingly, four hidden PATS 18A', 18B', 18C', and 18D' are provided, which correspond to the four possible subgroup combinations of three subgroups. Each such hidden PAT contains data for only the services contained in its corresponding three-subgroup combination. In addition, a fifth hidden PAT 18E may be provided, which corresponds to the combination of all data stream subgroups (subgroups 1–4). The fifth hidden PAT 18E may contain the combined data from the all-inclusive I phase PAT 19' from the I phase and the all-inclusive Q phase PAT contained in PAT stream 12" of the Q phase, since all four subgroups contained in both phases of the inbound multiplexed data stream 10' are being passed as output by the transcoder 20. However, in the event the fifth hidden PAT 18E is used, the transcoder and downstream communications channel will have to accommodate the combined data rate of all four subgroups, e.g., 36 Mbps in the event that each subgroup comprises a 9 Mbps stream.

The transcoder 20 (in cooperation with processor 40 associated therewith) will select one hidden PAT, re-map it to PID=0 and pass it, along with the subgroups it represents, to the output, all as described above in connection with FIG. 1.

In this manner, an incoming multiplexed data stream 10' with a data rate of approximately 36 Mbps may be reduced to an outbound data stream 30' having a data rate of approximately 27 Mbps, which contains a new PAT corresponding to the services provided therein for use in a 64 QAM cable system. Additionally, the example provided is able to produce an outbound data stream having a data rate of approximately 36 Mbps for use in a 256 QAM cable system if the hidden PAT corresponding to the combination of all four data stream subgroups is selected. Although a 256 QAM cable system is defined to run at a data rate of 38.8 Mbps, those skilled in the art will appreciate that a four subgroup combination output which generates approximately 36 Mbps can be used in a 256 QAM cable system, as it is within the standard capability of the transcoder 20 (or similar devices which provide the re-multiplexing function) to insert additional null packets into the multiplexed stream in order to provide the required 38.8 Mbps data rate. Similarly, the transcoder 20 may insert null packets into the outbound data stream 30 or 30' whenever the data rate of the outbound data stream is below the data rate required for the particular system.

Those skilled in the art will appreciate that the inbound multiplexed data stream 10' may have any number of subgroups, as well as any number of combinations thereof having varying data rates. Hidden PATs may be provided which correspond to different combinations of different numbers of subgroups, depending upon the output data rate required, such that the invention can be used in various types of cable systems.

Figure 5:
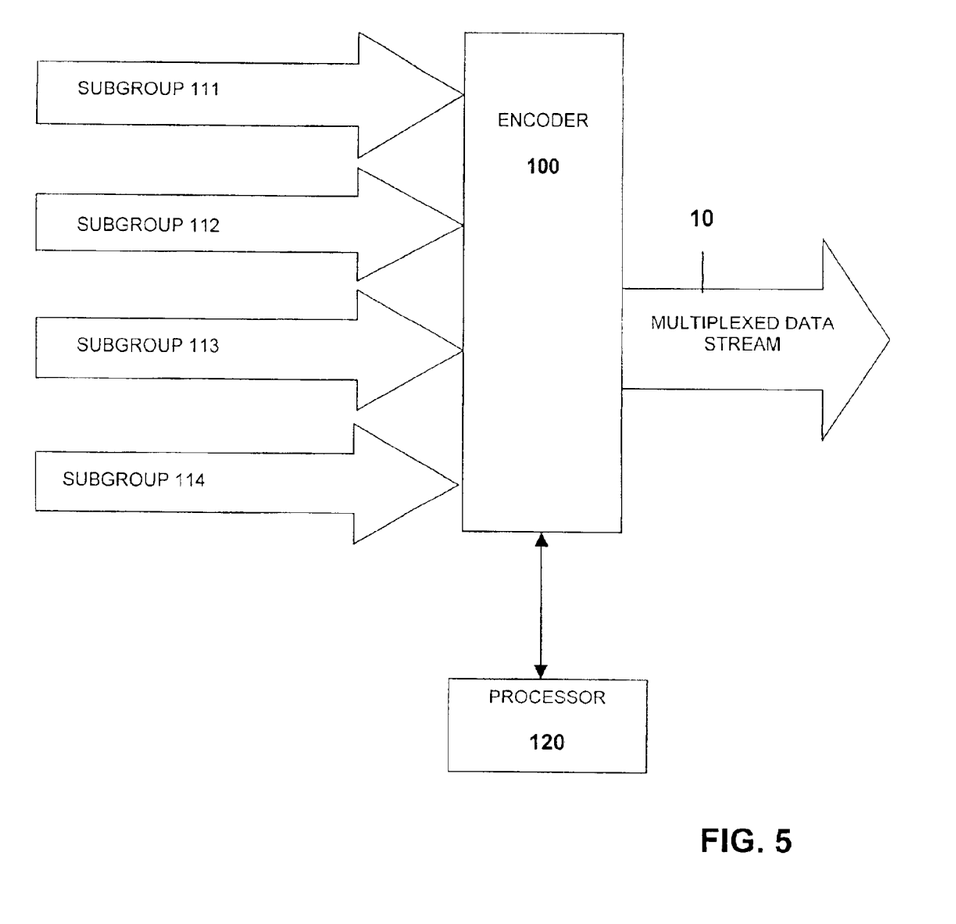
FIG. 5 is a block diagram of an illustration of the formation of the inbound multiplexed data stream.

As shown in FIG. 5, an encoder 100 may also be provided for constructing the inbound multiplexed data stream 10 which is to be reduced. The encoder 100 receives a plurality of multiplexed data stream subgroups 111, 112, 113, 114 (e.g., from various service providers). A processor 120 associated with the encoder 100 creates an all-inclusive PAT corresponding to all the services contained in the plurality of data stream subgroups 111, 112, 113, 114. The processor 120 also defines a plurality of data stream subgroup combinations and creates for each defined combination of data stream subgroups a hidden PAT identified by a unique PID. Each hidden PAT corresponds to the services contained in the associated combination of data stream subgroups. The encoder 100 combines the all-inclusive PAT, the hidden PATs, and the data stream subgroups to create the multiplexed data stream 10.

The present invention may be implemented using a combination of hardware and software.

It should now be appreciated that the invention provides advantageous methods and apparatus which allow a cable or satellite television headend decoder/transcoder (or other communications and/or data processing components) to create and output a PAT which correctly corresponds to the services in a reduced data stream (e.g., for cable-side transmissions). The present invention is particularly useful when reducing high data rate data streams, such as satellite television data streams, to a lower data rate for, e.g., cable-side transmission.

Although the invention has been described in connection with various illustrated embodiments, numerous modifications and adaptations may be made thereto without departing from the spirit and scope of the invention as set forth in the claims.

What is claimed is:

1. A method for constructing a program association table (PAT) when reducing a multiplexed data stream, comprising the steps of:
   receiving at a transcoder an inbound multiplexed data stream having an all-inclusive PAT, a plurality of pre-defined multiplexed data stream subgroups, and a plurality of hidden PATs, each hidden PAT identified by a unique packet identifier (PID) and associated with an allowable predefined combination of said multiplexed data stream subgroups;
   selecting one hidden PAT corresponding to a desired combination of multiplexed data stream subgroups;
   determining the PID makeup of the desired multiplexed data stream subgroup combination from the selected hidden PAT;
   discarding one or more of the all-inclusive PAT, unused hidden PATs, and any subgroups not contained in the desired multiplexed data stream subgroup combination;
   re-mapping the selected hidden PAT to a predetermined PID; and
   outputting the re-mapped PAT from the transcoder with the desired multiplexed data stream subgroup combination.

2. A method in accordance with claim 1, wherein the predetermined PID comprises the PID of the all-inclusive PAT.

3. A method in accordance with claim 1, wherein said predetermined PID comprises PID 0X0000.

4. A method in accordance with claim 1, wherein:
   the all-inclusive PAT, the unused hidden PATs, and any of the subgroups not contained in the desired multiplexed data stream subgroup combination are discarded.

5. A method in accordance with claim 1, wherein the inbound multiplexed data stream comprises a plurality of multiplexed data streams.

6. A method in accordance with claim 5, wherein the plurality of multiplexed data streams are from a plurality of sources.

7. A method in accordance with claim 6, wherein the plurality of sources comprises two or more satellite feeds.

8. A method in accordance with claim 1, wherein the inbound multiplexed data stream is carried on a multiphase carrier having an I phase and a Q Phase.

9. A method in accordance with claim 8, wherein a first plurality of subgroups are carried in the I phase and a second plurality of subgroups are carried in the Q phase.

10. A method in accordance with claim 8, wherein the all-inclusive PAT comprises:
    an all-inclusive I phase PAT carried in the I phase and corresponding to all services carried in the I phase; and
    an all-inclusive Q phase PAT carried in the Q phase and corresponding to all services carried in the Q phase.

11. A method in accordance with claim 1, wherein the inbound multiplexed data stream is an MPEG data stream.

12. A method in accordance with claim 1, wherein the inbound multiplexed data stream is carried on one of a high data rate QPSK carrier or VSB carrier.

13. A method in accordance with claim 1, wherein the transcoder outputs an intermediate frequency data stream having a maximum data rate of about 27 Mbps.

14. A method in accordance with claim 1, wherein the transcoder outputs an intermediate frequency data stream having a maximum data rate of about 38.8 Mbps.

15. A method in accordance with claim 1, further comprising the steps of constructing the inbound multiplexed data stream at an encoder.

16. A method in accordance with claim 15, wherein the step of constructing the inbound multiplexed data stream comprises the steps of:
    creating the all-inclusive PAT and the hidden PATs at the encoder; and
    combining the all-inclusive PAT and the hidden PATS with the multiplexed data stream subgroups to create the inbound multiplexed data stream.

17. Apparatus for constructing a program association table (PAT) when reducing a multiplexed data stream, comprising:
    a transcoder for receiving an inbound multiplexed data stream having an all-inclusive PAT, a plurality of pre-defined multiplexed data stream subgroups, and a plurality of hidden PATs, each hidden PAT identified by a unique packet identifier (PID) and associated with an allowable predefined combination of said multiplexed data stream subgroups; and
    a processor associated with said transcoder; wherein:
    said processor is coupled to receive from the transcoder said all-inclusive PAT and said hidden PATs for each multiplexed data stream subgroup combination;
    the processor is configured to select one hidden PAT corresponding to a desired multiplexed data stream subgroup combination;
    the processor determines the PID makeup of the desired multiplexed data stream subgroup combination from the selected hidden PAT;
    the processor discards one or more of the all-inclusive PAT, unused hidden PATs, and any subgroups not contained in the desired multiplexed data stream subgroup combination;
    the processor causes the transcoder to re-map the selected hidden PAT to a predetermined PID; and
    the transcoder outputs the re-mapped PAT with the selected multiplexed data stream subgroup combination.

18. Apparatus in accordance with claim 17, wherein the predetermined PID comprises the PID of the all-inclusive PAT.

19. Apparatus in accordance with claim 17, wherein said predetermined PID comprises PID 0X0000.

20. Apparatus in accordance with claim 17, wherein:
the processor discards the all-inclusive PAT, the unused hidden PATs, and any of the subgroups not contained in the desired multiplexed data stream subgroup combination.

21. Apparatus in accordance with claim 17, wherein the inbound multiplexed data stream comprises a plurality of multiplexed data streams.

22. Apparatus in accordance with claim 21, wherein the plurality of multiplexed data streams are from a plurality of sources.

23. Apparatus in accordance with claim 22, wherein the plurality of sources comprises two or more satellite feeds.

24. Apparatus in accordance with claim 17, wherein the inbound multiplexed data stream is carried on a multiphase carrier having an I phase and a Q phase.

25. Apparatus in accordance with claim 24, wherein a first plurality of subgroups are carried in the I phase and a second plurality of subgroups are carried in the Q phase.

26. Apparatus in accordance with claim 24, wherein the all-inclusive PAT comprises:
an all-inclusive I phase PAT carried in the I phase and corresponding to all services carried in the I phase; and
an all-inclusive Q phase PAT carried in the Q phase and corresponding to all services carried in the Q phase.

27. Apparatus in accordance with claim 17, wherein the inbound multiplexed data stream is an MPEG data stream.

28. Apparatus in accordance with claim 17, wherein the inbound multiplexed data stream is carried on one of a high data rate QPSK carrier or VSB carrier.

29. Apparatus in accordance with claim 17, wherein the transcoder outputs an intermediate frequency data stream subgroup having a maximum data rate of about 27 Mbps.

30. Apparatus in accordance with claim 17, wherein the transcoder outputs an intermediate frequency data stream subgroup having a maximum data rate of about 38.8 Mbps.

31. Apparatus in accordance with claim 17, further comprising an encoder for constructing the inbound multiplexed data stream.

32. Apparatus in accordance with claim 31, wherein:
the encoder creates the all-inclusive PAT and the hidden PATs; and
the encoder combines the all-inclusive PAT and the hidden PATs with the multiplexed data stream subgroups to create the inbound multiplexed data stream.

33. A method for creating a multiplexed data stream which is to be reduced, comprising:
receiving a plurality of multiplexed data stream subgroups;
creating an all-inclusive PAT describing all the services contained in the plurality of data stream subgroups;
defining a plurality of data stream subgroup combinations;
creating for each defined combination of data stream subgroups a hidden PAT identified by a unique PID, each hidden PAT describing the services contained in said defined combination of data stream subgroups;
combining said all-inclusive PAT, said hidden PATs, and said data stream subgroups to create a multiplexed data stream.

34. Apparatus for creating a multiplexed data stream which is to be reduced, comprising:
an encoder; and
a processor associated with the encoder;
wherein:
the encoder receives a plurality of multiplexed data stream subgroups;
the processor generates an all-inclusive PAT describing all the services contained in the plurality of data stream subgroups;
the processor defines a plurality of data stream subgroup combinations;
the processor creates for each defined combination of data stream subgroups a hidden PAT identified by a unique PID, each hidden PAT describing the services contained in said defined combination of data stream subgroups; and
the encoder combines said all-inclusive PAT, said hidden PATs, and said data stream subgroups to create a multiplexed data stream.

* * * * *